J. B. HARRELL.
ATTACHMENT FOR RIDING BREAKING PLOWS.
APPLICATION FILED DEC. 12, 1908.
962,342.
Patented June 21, 1910.
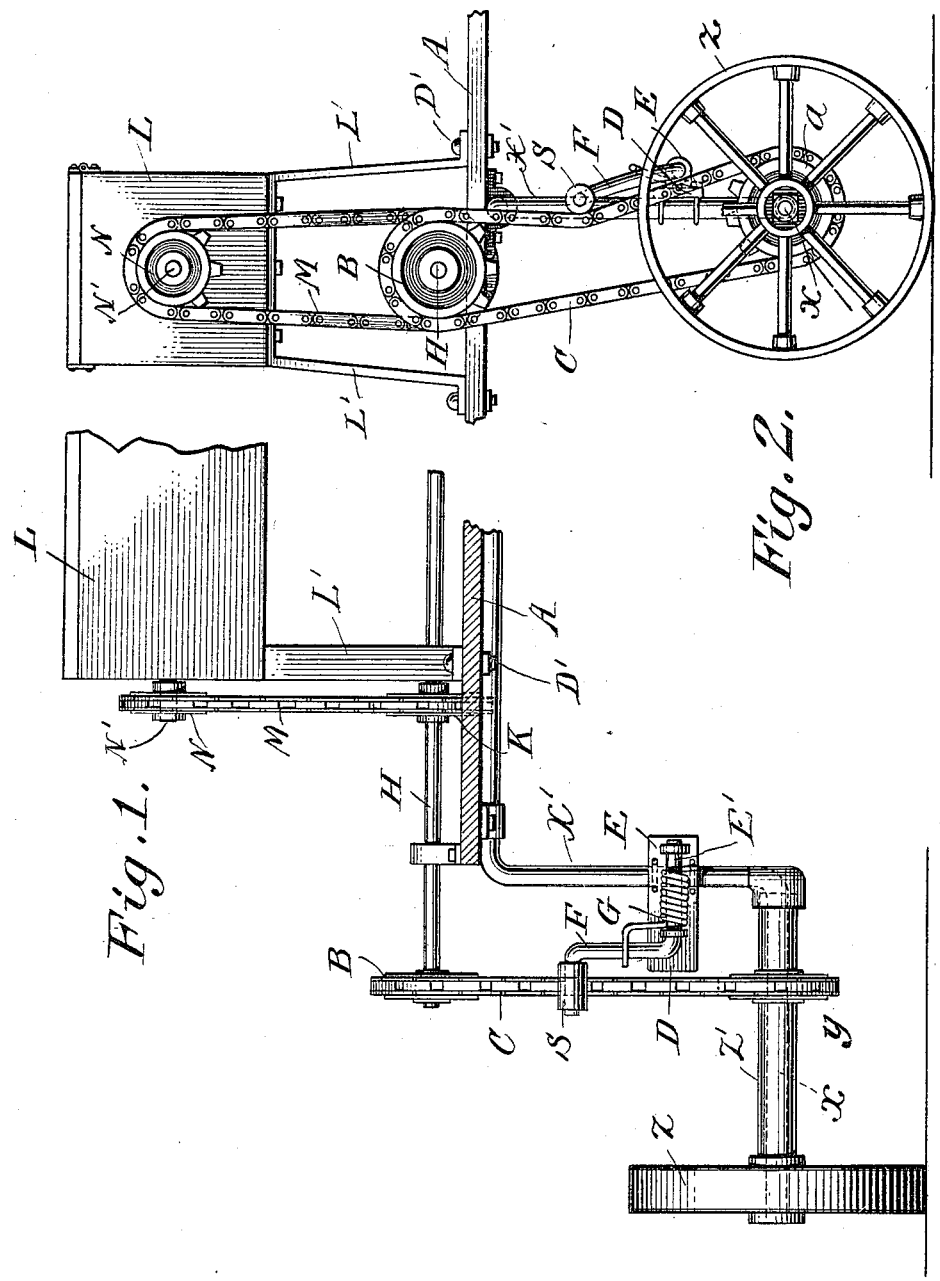
Witnesses:
E. L. Rector
J. K. Rector
Inventor:
Joab B. Harrell.

UNITED STATES PATENT OFFICE.

JOAB B. HARRELL, OF CHAPPEL, TEXAS.

ATTACHMENT FOR RIDING BREAKING-PLOWS.

962,342. Specification of Letters Patent. Patented June 21, 1910.

Application filed December 12, 1908. Serial No. 467,297.

*To all whom it may concern:*

Be it known that I, JOAB B. HARRELL, a citizen of the United States, residing at Chappel, in the county of San Saba and State of Texas, have invented certain new and useful Improvements in Attachments for Riding-Plows, of which the following is a specification.

This invention relates to seeder attachments for riding plows that are equipped with a land wheel and the invention has among its objects to provide a simple and efficient means for transmitting power from the land wheel of an ordinary break plow to run a grain seeder, the latter being attached to the frame of the plow.

A further object of the invention is to provide a device of the character described in which a suitable adjustment of the seeder plows may be obtained to permit the grain to be distributed where wanted.

Still further objects of the invention are to simplify and improve the construction and operation of a device of the character outlined above.

With these and other ends in view which will appear as the nature of the invention is better understood, the same consists in the improved construction and novel arrangement and combination of parts which will be hereinafter fully described and pointed out in the claims.

In the accompanying drawings has been illustrated a simple and preferred form of the invention, it being however understood that no limitation is necessarily made to the precise structural details therein exhibited, but that changes, alterations and modifications within the scope of the invention may be resorted to when desired.

In the drawing:—Figure 1 is a rear elevation showing the application of the invention to a riding plow, a portion of the frame of which is shown. Fig. 2 is a side elevation.

Corresponding parts in both figures are denoted by like characters of reference.

The wheel Z which is journaled on the spindle X of the crank axle X' represents the land wheel of a riding breaking plow, a portion of the frame of which is shown at A. The hub Z' carries a sprocket wheel Y which is connected by a chain C with a sprocket wheel B upon a shaft H which is supported for rotation upon the plow frame A. The seed box L is mounted upon brackets L', said brackets being mounted upon the plow frame by fastening means such as bolts D', said seed box being mounted in any position transversely of the plow frame where it shall be desired to distribute the seed, the shaft H being of sufficient length to extend beneath one end of the seed box in any position occupied by the latter. The shaft H carries a sprocket wheel K which is connected by a chain M with a sprocket wheel N upon the operating shaft N' to which motion in this manner is transmitted.

Securely mounted upon the crank axle X' is a plate D being provided with lugs E forming bearings wherein a rock shaft E' is mounted for oscillation, said rock shaft being provided with a crank F on which a roller S or idler bearing against the transmission chain C is supported, said roller or idler being held in contact with one lead of the chain by the action of a spring G which is coiled upon the shaft E, one end of said spring abutting against the plate D while the other end bears against the crank F.

In the operation of this device the seeder box is suitably mounted upon the plow frame, the remaining parts of the device being applied as described. As the land wheel rotates motion will be transmitted through the intermediate gearing to the operating shaft N' as will be readily understood. The roller or idler S upon the spring-actuated crank shaft mounted upon the plate D constitutes a tightening device, whereby the chain is kept taut at various adjustments of the land wheel. The entire device is simple, easily applied and thoroughly efficient in operation.

Having thus described the invention what is claimed as new, is:—

In a device of the character described, the combination with a riding plow having a land wheel supported upon a crank axle, of a seed box mounted upon the plow frame and having a shaft carrying a sprocket wheel, a sprocket wheel upon the hub of the land wheel, a shaft supported upon the plow frame, sprocket wheels upon said shaft, and chains connecting said sprocket wheels with the sprocket wheel upon the operating shaft and with that upon the land wheel.

JOAB B. HARRELL.

Witnesses:
E. L. RECTOR,
J. K. RECTOR.